US006346786B1

(12) United States Patent
Wood et al.

(10) Patent No.: US 6,346,786 B1
(45) Date of Patent: Feb. 12, 2002

(54) SYSTEM AND METHOD FOR MOVING A HORIZONTALLY MOVABLE PORTAL CLOSURE

(75) Inventors: John Wood; Jeff Wood, both of San Antonio, TX (US)

(73) Assignee: Linear Millenium Products, Inc., San Antonio, TX (US)

( * ) Notice: Subject to any disclaimer, the term of this patent is extended or adjusted under 35 U.S.C. 154(b) by 0 days.

(21) Appl. No.: 09/599,621

(22) Filed: Jun. 22, 2000

Related U.S. Application Data

(60) Provisional application No. 60/148,556, filed on Aug. 12, 1999.

(51) Int. Cl.[7] .................................................. H02P 3/00

(52) U.S. Cl. ........................ 318/264; 318/265; 318/286; 318/466; 318/135

(58) Field of Search ................ 49/26–27; 318/264–266, 318/286, 466–469, 618, 135

(56) References Cited

U.S. PATENT DOCUMENTS

| | | | | | |
|---|---|---|---|---|---|
| 3,697,838 | A | * | 10/1972 | New | 318/135 |
| 3,706,922 | A | * | 12/1972 | Inagaki | 318/135 |
| 4,529,920 | A | * | 7/1985 | Yoshida et al. | 318/466 |
| 4,796,011 | A | * | 1/1989 | Lemirande et al. | 318/266 |
| 4,855,653 | A | * | 8/1989 | Lemirande | 318/282 |
| 4,979,603 | A | * | 12/1990 | Wheatland | 318/469 |
| 5,141,082 | A | * | 8/1992 | Ishii et al. | 318/135 |
| 5,237,252 | A | * | 8/1993 | Tanaka et al. | 318/135 |
| 5,869,940 | A | * | 2/1999 | Parsadayan | 318/466 |
| 5,896,951 | A | | 4/1999 | Reddy et al. | 187/316 |
| 6,091,217 | A | * | 7/2000 | Parsadayan | 318/286 |

OTHER PUBLICATIONS

Northern Magnetics Linear Motor Tech. Manual p. 32.

* cited by examiner

*Primary Examiner*—Marlon T. Fletcher
(74) *Attorney, Agent, or Firm*—Jenkens & Gilchrist, A Professional Corporation

(57) ABSTRACT

A system and method for moving a horizontally sliding portal closure includes a linear induction or a magnetic stepper motor and a reaction piece. The reaction piece is attached to the portal closure such that activation of the stationary mounted linear induction or magnetic stepper motor causes movement of the reaction piece which, in turn, opens or closes the portal closure.

15 Claims, 1 Drawing Sheet

SYSTEM AND METHOD FOR MOVING A HORIZONTALLY MOVABLE PORTAL CLOSURE

This application claim benefit to provisional application No. 60/148,556 Aug. 12, 1999.

FIELD

The present invention applies to fence and barrier systems; more particularly, the present invention applies to gate or door opening systems typically used with fences or barriers.

BACKGROUND

For as long as fences or barriers have been used to enclose spaces, there has been a need to include in the fence or barrier system a portal for gaining access to the enclosed space. For security and for many other reasons, the portal to which access to the enclosed space may be gained typically includes a closure. Such portal closures may be opened in a variety of different directions to include both horizontal (parallel to the earth's surface) and vertical (perpendicular to the earth's surface). The present invention pertains to portal closures whose movement is substantially horizontal, such horizontal movement being along either a linear or an arcuate path with respect to the fence or barrier system.

Numerous systems have been used over the years to open gates or doors. One of the most common systems is a chain-drive system wherein the teeth on a rotating, stationary mounted, sprocket are used to engage the openings in a chain, which chain is mounted to a sliding gate. Such chain drive systems are slow, cumbersome, and prone to breakage. Such systems are also subject to the effects of weather; particularly the destructive effects of repeated exposure to moisture. Gates which open on an arcuate path typically use long arms—which long arms are prone to breakage.

There is therefore a need in the art to provide a system for opening a gate which will be fast operating, easy to use, and low in maintenance.

SUMMARY

A fast operating, easy to use, and relatively maintenance free system and method for moving a horizontally movable gate or door includes a stationary mounted linear induction motor or a magnetic stepper motor. A reaction piece, either a reaction plate or a reaction rod, is caused to move by the linear induction motor or the magnetic stepper motor. The movement of the reaction piece, which is mounted to the gate or door, is then used to control the opening and closing of the gate or door. When it is desired to open the gate or door, the linear induction motor is activated. The activation of the linear induction motor causes the reaction plate or reaction rod to move with respect to the position the linear induction motor. Because the reaction plate or reaction rod is mounted to the gate or door, the movement of the reaction plate or reaction rod causes the gate or door to move to an open position so that access to an enclosed space is allowed. Alternatively, the movement of the gate or door may be to a closed position so that the opening to the enclosed space is blocked.

BRIEF DESCRIPTION OF THE DRAWING FIGURES

A better understanding of the system and method for moving a horizontally movable portal closure of the present invention will be had by reference to the drawing figures wherein.

DETAILED DESCRIPTION OF THE EMBODIMENTS

As may be seen by reference to FIG. 1 and FIG. 2, the system and method of the present invention 10, 110 is described with reference to the opening and closing of a gate 20, 120 in a fence 100. Those of ordinary skill in the art will understand that the present invention has applicability to any type of portal closure whose movement is substantially horizontal—either parallel or at an angle to the fence 100. The portal may be formed in a gate, a wall, or any type of barrier which encloses a space.

Figure 1:
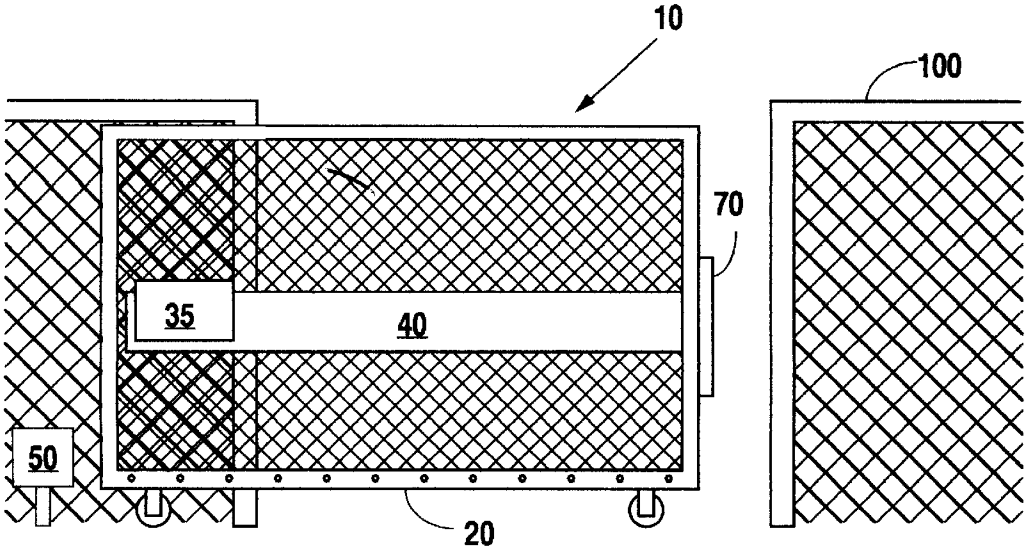
FIG. 1 is a schematic front elevational view of the system of the present invention on a linearly horizontally moving portal closure.

In FIG. 1, the system and method of the present invention 10 is shown with a linear induction motor system 30 of the type that is frequently used on amusement park rides, particularly roller coasters. In a roller coaster, such linear induction motor systems initiate the motion of the string of passenger cars up an incline to begin the coasting motion of the ride. Specifically, the linear induction motor systems include a reaction plate on the passenger car. The reaction plate is constructed and arranged to be moved by a series of linear induction motors mounted between the rails on which the passenger cars roll. The reaction plates used in linear induction motor systems may be made of steel covered with a non-magnetic metal such as aluminum or copper, or they may be made from a solid non-magnetic metal such as aluminum or copper. Because of the magnetic fields applied by the linear induction motor to the reaction plate, the reaction plate is caused to be accelerated from a rest condition to a predetermined velocity past the linear induction motor.

In FIG. 1, the linear induction motor 35 imparts motion to the reaction plate 40 which causes the gate 20 to slide horizontally between open and closed positions. In FIG. 2, the linear induction motor 135 imparts motion to the reaction rod 145 which causes the gate 120 to swing on hinges 125 between open and closed positions. Alternatively, a magnetic stepper motor may be used instead of a linear induction motor. When a magnetic stepper motor is used the reaction plate may include a plurality of steel ridges formed on a steel plate. The steel ridges on the steel plate electrically interact with the permanent magnets within the magnetic stepper motor. When a reaction rod is used, the steel rod may include a plurality of steel rings. The steel rings electrically interact with the permanent magnets in the stepper motor.

As is commonly experienced with linear induction motors 35, 135, the acceleration of the reaction plate or reaction rod past the linear induction motor 35 or through the linear induction motor 135 can be quite rapid. Such rapid acceleration is particularly desirable in a situation where it is necessary to open and close a portal closure in a minimum amount of time—as in prisons or incarceration facilities.

When it is desired to move the portal closure 20, 120 from a first closed or rest position, it is necessary to accelerate the portal closure 20, 120 to a predetermined linear or arcuate speed. As the portal closure 20, 120 nears the end of its travel path, it is then necessary to decelerate the portal closure 20, 120 from its linear or arcuate speed to a second nonmoving or rest position. Such acceleration and deceleration of the portal closure 20, 120 is easily governed by controlling the force and direction imparted on the reaction plate 40 or reaction rod 145 by the linear induction motor or the magnetic stepper motor 35, 135. For particularly heavy gates a second linear induction motor or magnetic stepper motor may be placed alongside the first motor on the same side of the reaction plate or reaction rod or on the opposite side of the reaction plate or reaction rod.

While it is possible to program into the electronics 60 that control the linear induction motor or the magnetic stepper motor 35, 135, the amount of time needed to accelerate the portal closure 20, 120 to its desired translational speed, then move the portal closure 20, 120 at this desired translational speed for a predetermined period of time or travel distance, and then decelerate the movement of the portal closure 20, 120 at the end at the end of its travel path according to a selected time or travel distance, some applications may require more precise control of the position of the portal closure 20, 120. More precise control of the movement of the portal closure 20, 120 may be obtained by the use of a position sensing system 50 (FIG. 3) which provides a signal indicative of the position of the portal closure 20 along its travel path. Such position sensors may be inductive, rotary, magnetic, or photoelectric. Such inductive, rotary, magnetic, or photoelectric position sensors 50 are well known to those of ordinary skill in the art.

Figure 3:
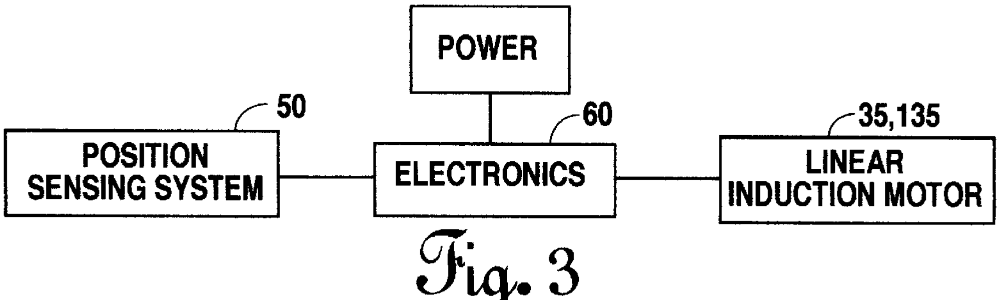
FIG. 3 is a schematic diagram of the electrical connection of the various parts of the system.

As shown in FIG. 3, the signals obtained from the position sensors 50 may be electronically transmitted or coupled to an electronic control means 60. The electronic control means 60 governs the force applied by the induction motor or the magnetic stepper motor 35, 135 on the reaction plate 45 or the reaction rod 145 so that the termination of the period of acceleration of the travel of the portal closure 20, 120 to the translational speed may be governed by the actual position of the portal closure 20, 120, and the initiation of the deceleration of the motion of the portal closure 20, 120 to the second or rest position may also be governed by the sensed position of the portal closure 20, 120.

As shown in FIG. 1, the portal closure 20, may include one or more pressure sensitive switches 70 on its ends to cut off power to the linear induction motor 35 when the position of the portal closure 20 matches the first or second rest position of the portal closure or when an object appears in the path of travel of the moving portal closure 20. Power may be supplied to the system from commercially available sources of electrical energy, or a solar power unit may be used to provide the necessary electrical energy to operate the system. A similar array of pressure sensitive switches may also be used on the embodiment shown in FIG. 2.

Figure 2:
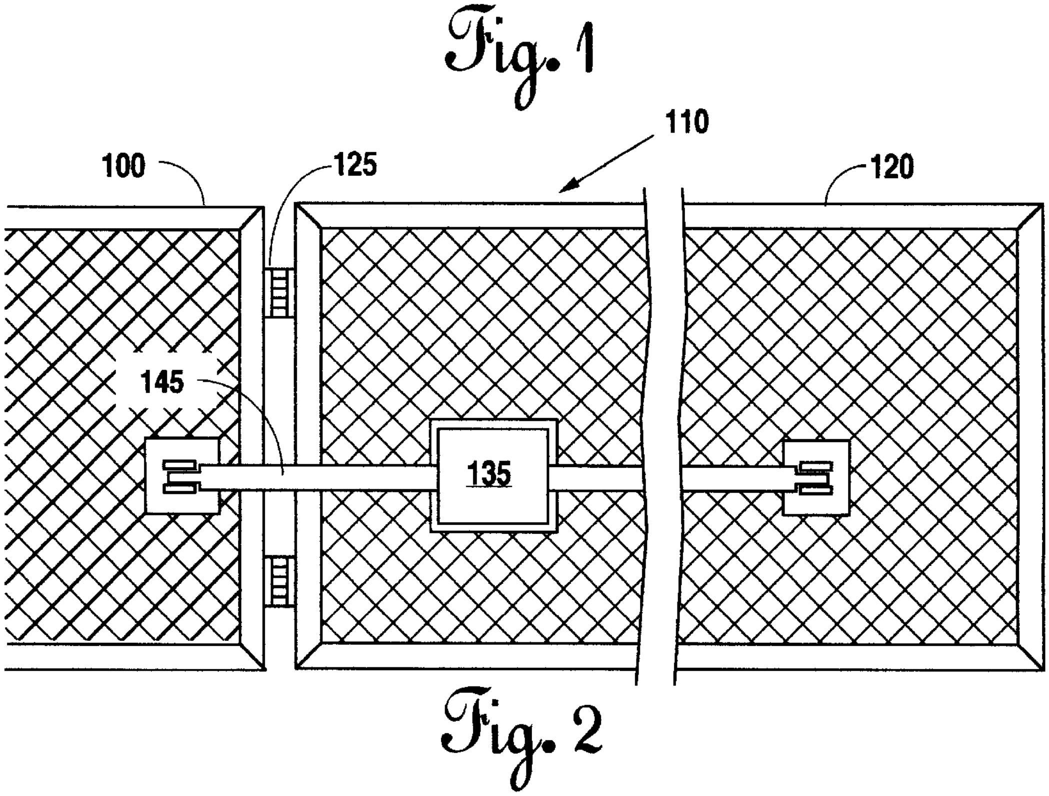
FIG. 2 is a schematic front-elevational view of the system of the present invention on an arcuately horizontally movable portal closure.

As shown in FIG. 2, the alternate embodiment of the system 110 of the present invention may be constructed so that it is operable with an arcuately pivotable gate or portal closure. Specifically, a reaction rod 140 is caused to pass through an induction motor or a magnetic stepper motor 135. This will cause the portal closure 120 to swing open or closed, pivoting on a pair of hinges 125.

As shown in FIG. 1, the construction of the system and method for moving a movable portal closure of the present invention horizontally includes simply mounting the reaction plate 40 on a gate 20 which is movable along a horizontal path. This motion is typically governed by a wheel and track assembly, guideways or other systems well known to those of ordinary skill in the art.

The linear induction motor or the magnetic stepper motor is located in close proximity to the travel path of the moving portal closure. Typically, the linear induction motor or the magnetic stepper motor is mounted in a stationary manner near the edge of the portal which is formed in the enclosure surrounding the space through which access through the portal is obtained.

While the foregoing disclosure enables those of ordinary skill in the art to make and use the disclosed invention, it will be understood that the foregoing disclosure will also enable those of ordinary skill in the art to make similar embodiments which include the principles of the disclosed invention. Such similar embodiments shall be included within the scope of the appended claims.

What is claimed is:

1. A system for moving a horizontally movable portal closure, said system comprising:

means for guiding the horizontal movement of said portal closure;

a non-magnetic reaction plate attached to said portal closure;

an electronically controlled stationary linear induction motor constructed and arranged to accelerate and decelerate the horizontal motion of said non-magnetic reaction plate by varying the electrical force imparted to said non-magnetic reaction plate by said electronically controlled stationary linear induction motor;

whereby the portal closure is moved by the electrical force on said non-magnetic reaction plate imparted by said electronically controlled stationary linear induction motor.

2. The system as defined in claim 1 further including position sensor means coupled to said electronic control means for imparting a motion control signal to said electronic control means at predetermined points along the movement path of said portal closure.

3. The system as defined in claim 2 wherein said position sensor means are inductive.

4. The system as defined in claim 2 wherein said position sensor means are magnetic.

5. The system as defined in claim 2 wherein said position sensor means are photoelectric.

6. The system as defined in claim 2 wherein said position sensor means are rotary.

7. The system as defined in claim 1 further including at least one switch located on said portal closure for cutting off the power to said linear induction or magnetic stepper motor.

8. A method for controlling the movement of a portal closure in a horizontal plane, said method comprising the steps of:

mounting a non-magnetic reaction plate to the portal closure;

mounting an electronically controlled linear induction motor in a stationary position with respect to said non-magnetic reaction piece for controlling the electrical force imparted on said non-magnetic reaction plate by said electronically controlled linear induction motor;

whereby activation of said electronically controlled linear induction motor will accelerate or decelerate said non-magnetic reaction plate, which in turn imparts motion to said portal closure.

9. The method as defined in claim 8 further including the step of sensing the position of said portal closure.

10. The method as defined in claim 8 further including the step of regulating the force applied to said linear induction motor by the sensed position of said portal closure.

11. A system for controlling access to an enclosed space comprising:

a portal enabling access to said enclosed space;

a horizontally movable closure constructed and arranged to control passage through said portal;

a reaction plate mounted to said horizontally movable closure; and an electronically controlled non-magnetic stationary linear induction motor constructed and arranged to impart horizontal motion to said non-magnetic reaction plate be electrical force imparted on said non-magnetic reaction plate by said electronically controlled stationary linear induction motor.

12. The system as defined in claim 10 wherein said horizontally movable closure is linearly slidable.

13. The system as defined in claim 10 wherein said horizontally movable closure is a arcuately pivotable.

14. The system as defined in claim 11 wherein said electronic controller enables the acceleration of said horizontally movable closure to a predetermined translational speed upon the initiation of the movement of said horizontally movable closure.

15. The system as defined in claim 11 wherein said electronic controller enables the deceleration of said horizontally movable closure from a predetermined translational speed in anticipation of the termination of the movement of said horizontally movable closure.

* * * * *